US011569752B2

(12) United States Patent
Eckert et al.

(10) Patent No.: US 11,569,752 B2
(45) Date of Patent: Jan. 31, 2023

(54) ARRANGEMENT FOR EQUALIZING VOLTAGE DROPS IN A POWER SUPPLY MAINS AND METHOD FOR EQUALIZING VOLTAGE DROPS IN A POWER SUPPLY MAINS

(71) Applicant: Fluence Energy, LLC, Arlington, VA (US)

(72) Inventors: Peter Eckert, Erlangen (DE); Oliver Reimann, Erlangen (DE); Johannes Reinschke, Nuremberg (DE)

(73) Assignee: Fluence Energy, LLC, Arlington, VA (US)

( * ) Notice: Subject to any disclaimer, the term of this patent is extended or adjusted under 35 U.S.C. 154(b) by 98 days.

(21) Appl. No.: 16/628,061

(22) PCT Filed: Jun. 27, 2018

(86) PCT No.: PCT/EP2018/067254
§ 371 (c)(1),
(2) Date: Jan. 2, 2020

(87) PCT Pub. No.: WO2019/007778
PCT Pub. Date: Jan. 10, 2019

(65) Prior Publication Data
US 2021/0257835 A1 Aug. 19, 2021

(30) Foreign Application Priority Data
Jul. 4, 2017 (DE) ...................... 10 2017 211 356.1

(51) Int. Cl.
*H02J 1/00* (2006.01)
*H02J 3/00* (2006.01)
(Continued)

(52) U.S. Cl.
CPC ............... *H02M 5/458* (2013.01); *H02J 3/04* (2013.01); *H02J 3/32* (2013.01); *H02J 3/38* (2013.01); *H02J 9/062* (2013.01); *H02J 9/068* (2020.01)

(58) Field of Classification Search
CPC .. H02J 3/001; H02J 9/062; H02J 9/068; H02J 3/32; H02J 3/04; H02J 3/38; H02M 5/458
(Continued)

(56) References Cited

U.S. PATENT DOCUMENTS 6,304,006 B1 * 10/2001 Jungreis .................... H02J 3/38
307/64
2005/0184592 A1 8/2005 Marwali et al.
(Continued)

FOREIGN PATENT DOCUMENTS

EP 3072209 A1 9/2016

OTHER PUBLICATIONS

International Search Report PCT/ISA/210 for International Application No. PCT/EP2018/067254 dated Oct. 19, 2018.
(Continued)

*Primary Examiner* — Richard Tan
(74) *Attorney, Agent, or Firm* — RatnerPrestia

(57) ABSTRACT

An embodiment relates to an arrangement for equalizing voltage drops in a power supply mains having a first mains supply and a second mains supply. The arrangement includes at least one first converter system and one second converter system, to which intermediate circuits are coupled and which form a mains coupling as a result. The first mains supply is connected to a distributor via a decoupling inductor, a voltage measurement and a first switch. The second mains supply is connected to the distributor via a second switch, and wherein the mains coupling is arranged parallel to the second switch.

15 Claims, 3 Drawing Sheets

(51) Int. Cl.
    *H02M 5/458*      (2006.01)
    *H02J 9/06*       (2006.01)
    *H02J 3/04*       (2006.01)
    *H02J 3/32*       (2006.01)
    *H02J 3/38*       (2006.01)

(58) Field of Classification Search
    USPC .......................................................... 307/82
    See application file for complete search history.

(56) References Cited

U.S. PATENT DOCUMENTS

| | | | |
|---|---|---|---|
| 2005/0201127 A1* | 9/2005 | Tracy | H02J 9/062 |
| | | | 363/37 |
| 2006/0226706 A1 | 10/2006 | Edelen et al. | |
| 2013/0193760 A1* | 8/2013 | Colombi | H02J 9/061 |
| | | | 307/64 |
| 2014/0368043 A1* | 12/2014 | Colombi | H02J 3/1842 |
| | | | 307/66 |
| 2016/0181864 A1* | 6/2016 | Reddy | H02J 9/061 |
| | | | 307/66 |
| 2017/0163088 A1 | 6/2017 | Toyoda | |
| 2017/0214249 A1* | 7/2017 | Seeley | H02J 3/44 |

OTHER PUBLICATIONS

Written Opinion of the International Searching Authority PCT/ISA/237 for International Application No. PCT/EP2018/067254 dated Oct. 19, 2018.

\* cited by examiner

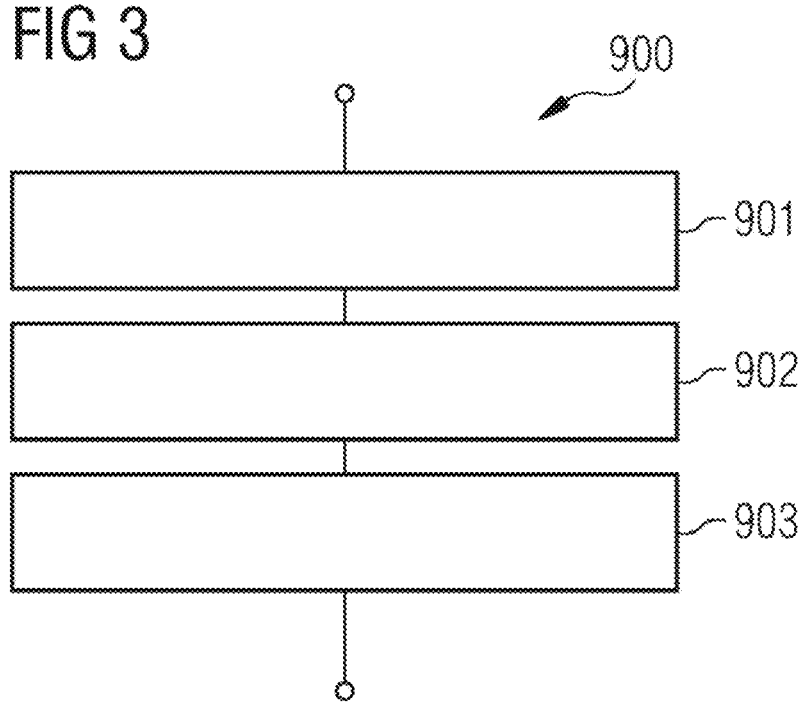
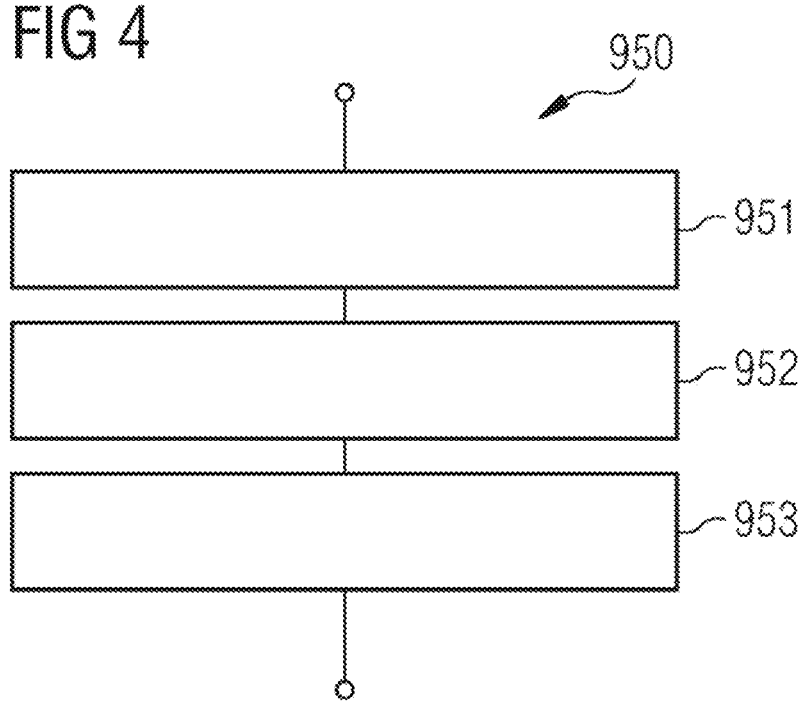

ARRANGEMENT FOR EQUALIZING VOLTAGE DROPS IN A POWER SUPPLY MAINS AND METHOD FOR EQUALIZING VOLTAGE DROPS IN A POWER SUPPLY MAINS

PRIORITY STATEMENT

This application is the national phase under 35 U.S.C. § 371 of PCT International Application No. PCT/EP2018/067254, which has an International filing date of Jun. 27, 2018, and which claims priority to German patent application number DE 102017211356.1 filed Jul. 4, 2017, the entire contents of each of which are hereby incorporated herein by reference.

FIELD

Embodiments of invention generally relate to an arrangement for compensating voltage drops in a power supply grid and to methods for compensating voltage drops in a power supply grid.

BACKGROUND

Voltage drops in grid supply systems occur more or less often, mostly due to natural causes. By way of example, these may be weather situations, a bird strike or other external influences. These events are generally brief, typically 50 ms to a few 100 ms, and may lead to brief interruptions of typically up to 300 ms or longer interruptions of up to 3 minutes or longer.

The extent of the voltage drop may vary between 20% and 100%, the voltage drop being able to occur on a single-pole or multi-pole basis. These even very brief drops in the voltage supply often lead to disruptions in facilities such as manufacturing and processing installations. By way of example, a robot controller or the like may fail, sometimes giving rise to considerable financial losses.

Daehler, Eichler, Gaupp and Linhofer: ABB Technik 1/2001 have pointed out the need for a high power supply quality for more stable manufacturing processes. Here, they make reference for example to large, fast uninterruptible power supplies (UPS), but these typically first take effect when there is a complete power outage. For brief interruptions that often occur only in one phase, they describe known voltage stabilizers such as dynamic voltage restorers (DVR). These voltage stabilizers are able to compensate temporary voltage drops without a delay.

For the fast compensation of grid drops, energy stores decoupled from the grid, what are known as line interactive UPS, may likewise be used, these being able to bridge total failures of the grid voltage that even last for minutes.

Pal and Gupta: Electrical & Computer Engineering: An International Journal (ECIJ) vol. 4, no. 2, June 2015, generally describe how voltage drops are able to be compensated by way of known voltage stabilizers such as dynamic voltage restorers.

SUMMARY

The inventors have recognized that known dynamic voltage restorer voltage stabilizers are restricted in terms of dealing with the fault type, duration and in terms of power, and are therefore only able to overcome a portion of all of the faults. The size of this portion depends on the local circumstances. By way of example, dynamic voltage restorer voltage stabilizers are only able to compensate voltage drops of up to roughly 40% residual voltage. An interruption of the voltage supply is not able to be compensated. An active power is likewise not able to be transferred.

At least one embodiment of the invention therefore provides an arrangement and/or method, which are able to compensate voltage drops in the grid reliably and quickly.

At least one embodiment of the invention is directed to an arrangement for compensating voltage drops in a power supply grid. Advantageous configurations of the arrangement according to the invention are specified in the claims. At least one embodiment of the invention is directed to a method for compensating voltage drops in a power supply grid.

One advantageous configuration is specified in the dependent claims.

The arrangement for compensating voltage drops in a power supply grid having a first grid supply and a second grid supply according to at least one embodiment of the invention comprises at least one first converter system and one second converter system whose intermediate circuits are coupled and that thereby form a grid connection, wherein the first grid supply is connected to a distribution via a decoupling choke, a voltage measurement and a first switch, wherein the second grid supply is connected to the distribution via a second switch, and wherein the grid connection is arranged in parallel with the second switch.

An arrangement of at least one embodiment is for compensating voltage drops in a power supply grid including a first grid supply and a second grid supply, the arrangement comprising:

at least one first converter system; and one second converter system, intermediate circuits of the at least one converter system and the one second converter system being coupled to form a grid connection, wherein the first grid supply is connected to a distribution via a decoupling choke, a voltage measurement and a first switch, wherein the second grid supply is connected to the distribution via a second switch, and wherein the grid connection is arranged in parallel with the second switch.

A method of at least one embodiment is for compensating a voltage drop in a power supply grid, including an arrangement originally in a first system state, of the method comprising:

opening a first switch of a first grid supply of the power supply grid in an event of a voltage drop;

matching a phase of a distribution to a phase of a second grid supply of the power supply grid; and closing a second switch as soon as the phase of the distribution and the phase of the second grid supply are matched, to place the arrangement in a second system state.

A method of at least one embodiment is for compensating for a voltage drop in a power supply grid, including an arrangement originally in a second system state, of the method comprising:

opening a second switch of a second grid supply of the power supply grid;

matching a phase of a distribution to a phase of a first grid supply of the power supply grid; and closing a first switch as soon as the phase of the distribution and the phase of the first grid supply are matched, to place the arrangement is in a first system state.

The method according to of at least one embodiment of the invention for compensating voltage drops in a power supply grid is equipped with an arrangement according to the invention, wherein the arrangement is originally in the first system state, having the steps of:
- opening the first switch of the first grid supply in the event of voltage drops;
- matching the phase of the distribution to the phase of the second grid supply; and
- closing the second switch as soon as the phase of the distribution and of the second grid supply are matched, by way of which the arrangement is in the second system state.

The method according to at least one embodiment of the invention serves to transfer the arrangement from the second system state back to the first system state after the voltage drop of the first grid supply has cleared, wherein this method comprises an arrangement according to the invention, wherein the arrangement is originally in the second system state, having the steps of:
- opening the second switch of the second grid supply;
- matching the phase of the distribution to the phase of the first grid supply; and
- closing the first switch as soon as the phase of the distribution and of the first grid supply are matched, by way of which the arrangement is in the first system state.

BRIEF DESCRIPTION OF THE DRAWINGS

The above-described properties, features and advantages of this application and the way in which they are achieved will become clearer and more clearly comprehensible in connection with the following description of the example embodiments that are explained in more detail in connection with the figures. In the figures:

FIG. 3 shows a method, in order to compensate voltage drops in a power supply grid, for transferring from the first system state to the second system state; and FIG. 4 shows a method, after voltage drops in a power supply grid have cleared, for transferring from the second system state to the first system state.

DETAILED DESCRIPTION OF EXAMPLE EMBODIMENTS

Figure 1:
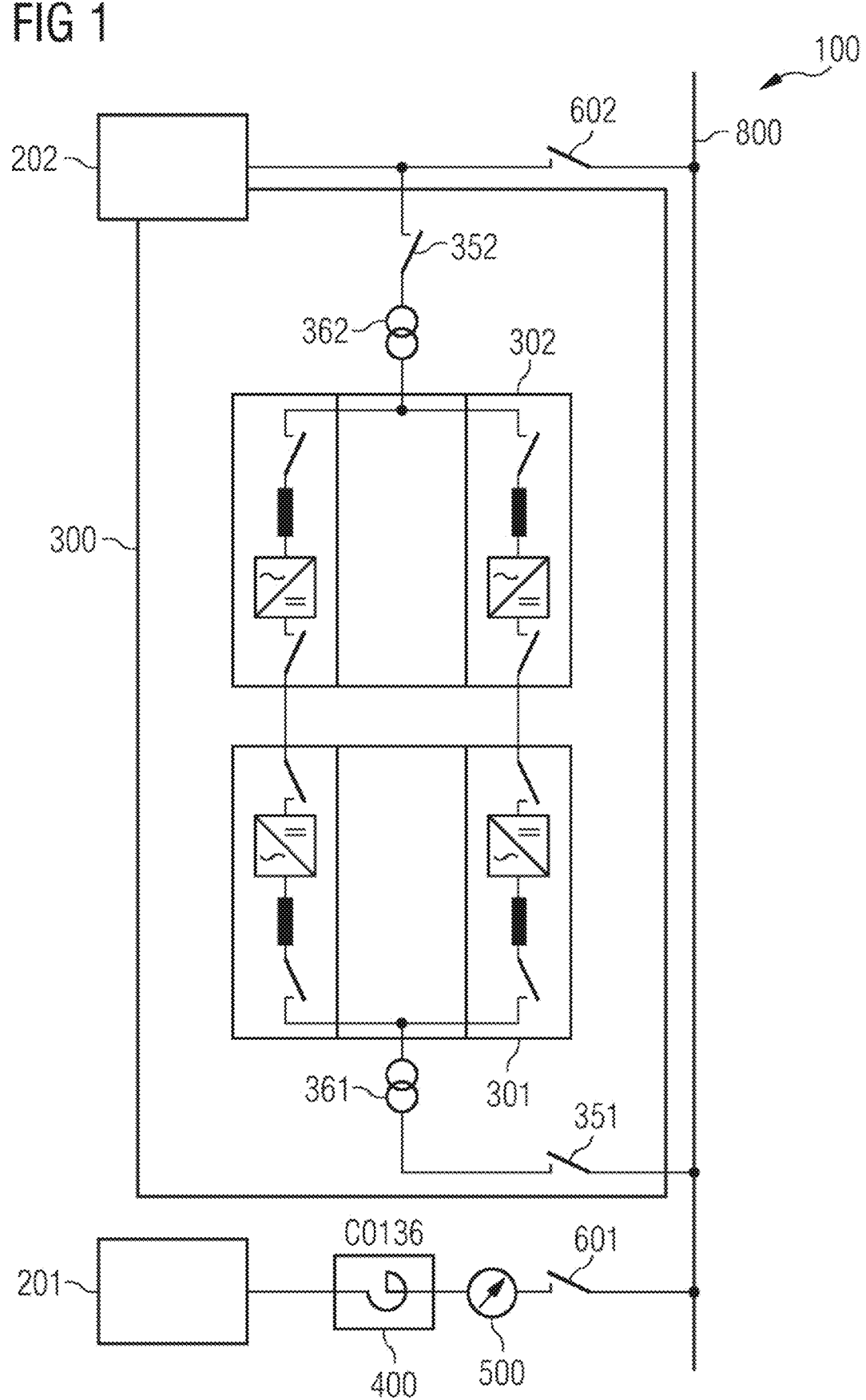
FIG. 1 shows an arrangement for compensating voltage drops in a power supply grid having a first converter system and a second converter system.

The arrangement for compensating voltage drops in a power supply grid having a first grid supply and a second grid supply according to at least one embodiment of the invention comprises at least one first converter system and one second converter system whose intermediate circuits are coupled and that thereby form a grid connection, wherein the first grid supply is connected to a distribution via a decoupling choke, a voltage measurement and a first switch, wherein the second grid supply is connected to the distribution via a second switch, and wherein the grid connection is arranged in parallel with the second switch.

In this case, it is advantageous that conventional medium-voltage switches are able to be used by virtue of the arrangement according to the invention, as a result of which it is possible to avoid electronic medium-voltage switches.

In the event of faults in one of the two grid supplies, the power is able to be transferred from one grid supply system to the other.

In one configuration of at least one embodiment, the first converter system and the second converter system are each designed as DC/AC converter systems.

In a further configuration of at least one embodiment, the distribution is designed as a medium-voltage distribution.

In one configuration of at least one embodiment, the connection of the intermediate circuits comprises battery systems. In this case, it is advantageous that the arrangement according to of at least one embodiment of the invention is able to support the voltage in the event of a fault in the first or second grid supply.

According to a further configuration of at least one embodiment, the first switch is closed and the second switch is open in a first system state.

In a further configuration, the first switch is open and the second switch is closed in a second system state.

The method according to at least one embodiment of the invention for compensating voltage drops in a power supply grid is equipped with an arrangement according to the invention, wherein the arrangement is originally in the first system state, having the steps of:
- opening the first switch of the first grid supply in the event of voltage drops;
- matching the phase of the distribution to the phase of the second grid supply; and
- closing the second switch as soon as the phase of the distribution and of the second grid supply are matched, by way of which the arrangement is in the second system state.

The method according to at least one embodiment of the invention serves to transfer the arrangement from the second system state back to the first system state after the voltage drop of the first grid supply has cleared, wherein this method comprises an arrangement according to the invention, wherein the arrangement is originally in the second system state, having the steps of:
- opening the second switch of the second grid supply;
- matching the phase of the distribution to the phase of the first grid supply; and
- closing the first switch as soon as the phase of the distribution and of the first grid supply are matched, by way of which the arrangement is in the first system state.

In a further configuration of the two methods according to at least one embodiment of the invention, measured values of the voltage measurement are used to match the phase of the distribution to the phase of the first grid supply or of the second grid supply.

FIG. 1 illustrates an arrangement 100 according to an embodiment of the invention for compensating voltage drops in a power supply grid. The arrangement 100 comprises a first grid supply 201 and a second grid supply 202, and also at least one first converter system 301 and one second converter system 302, whose intermediate circuits are coupled and that thereby form a grid connection 300.

The first grid supply 201 is connected to a distribution 800 via a decoupling choke 400, a voltage measurement 500 and a first switch 601. The second grid supply 202 is connected to the distribution 800 via a second switch 602. The grid connection 300 is arranged in parallel with the second switch 602 across the second grid supply 202.

A first converter switch 351 and a second converter switch 352 are also provided in order to disconnect the grid connection 300. By way of example, in the case of the first converter system 301, this is connected to the distribution 800 via a first converter transformer 361 and the first converter switch 351. In the same way, the second converter system 302 is connected to the second grid supply 202 via a second converter transformer 362 and the second converter switch 352.

The first converter system 301 and the second converter system 302 may in each case be a DC/AC converter system. The distribution 800 may be designed as a medium-voltage distribution.

Figure 2:
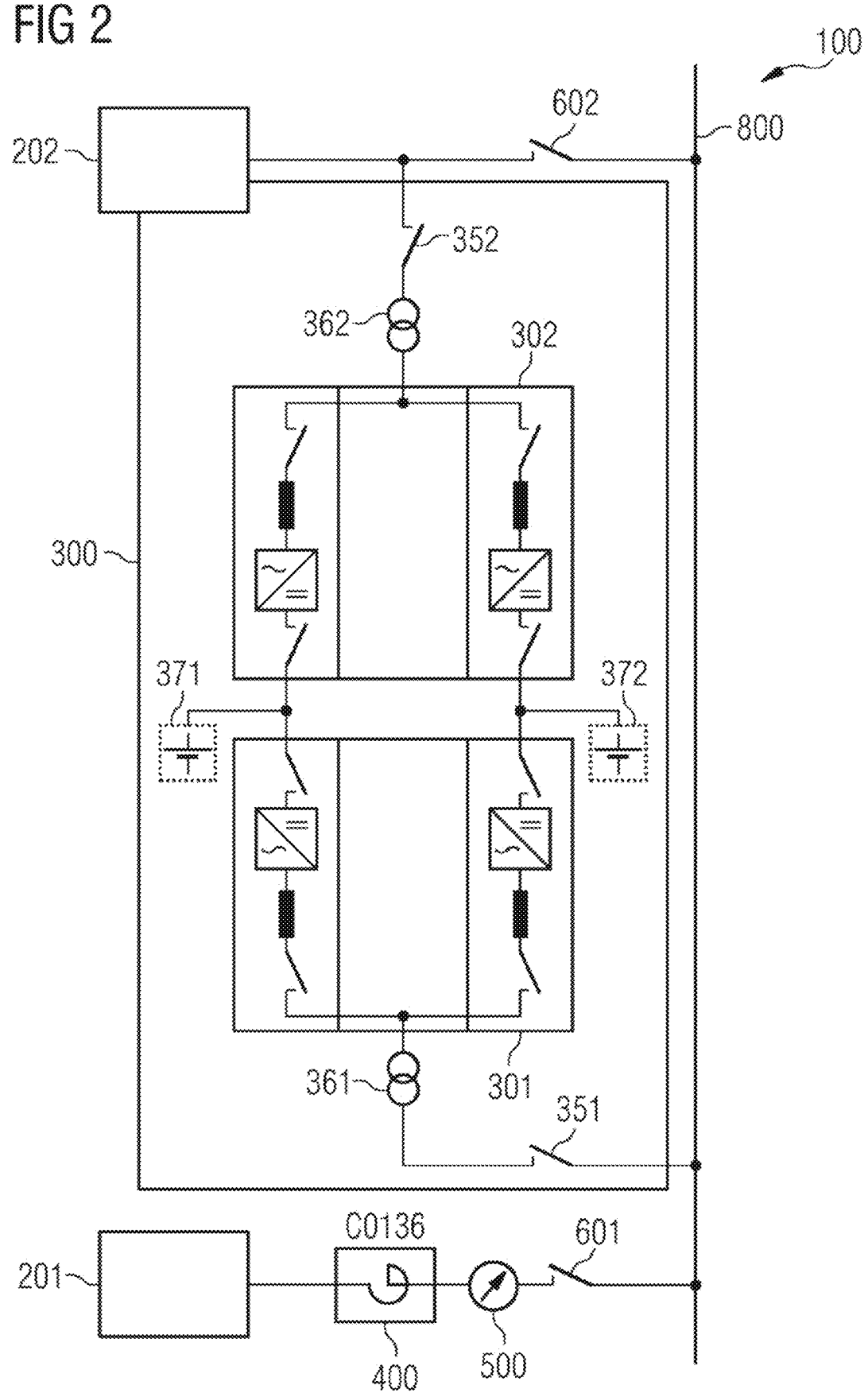
FIG. 2 shows an arrangement for compensating voltage drops in a power supply grid having a first converter system and a second converter system, and battery systems in the connection of the intermediate circuits.

FIG. 2 illustrates the arrangement 100 according to an embodiment of the invention from FIG. 1, wherein the connection of the intermediate circuits comprises battery systems 371, 372. These battery systems make it possible to support the voltage at the distribution 800 in the event of a simultaneous failure of the first grid supply 201 and the second grid supply 202.

The arrangement 100 illustrated in FIGS. 1 and 2 is in a first system state when the first switch 601 is closed and the second switch 602 is open. This first system state is the normal state. In the first system state, the first grid supply 201 is responsible for the energy supply of the distribution 800.

In the event that the first grid supply 201 drops or fails, the second grid supply 202 should take over the voltage supply of the distribution 800. In this second system state, the first switch 601 is open, as a result of which the first grid supply 201 is disconnected from the distribution 800, and the second switch 602 is closed.

The transition from the first system state to the second system state and back from the second system state to the first system state is explained in more detail in the following FIGS. 3 and 4.

FIG. 3 illustrates a method 900 for compensating voltage drops in a power supply grid, wherein the method 900 transfers the arrangement 100 according to an embodiment of the invention from the first system state to the second system state. To this end, the method 900 comprises the steps of:

opening 901 the first switch 601 of the first grid supply 201 in the event of voltage drops;

matching 901 the phase of the distribution 800 to the phase of the second grid supply 202; and closing 903 the second switch 602 as soon as the phase of the distribution 800 and of the second grid supply 202 are matched, by way of which the arrangement 100 is in the second system state.

FIG. 4 illustrates a method 950 after voltage drops in a power supply grid have cleared, wherein this method 950 transfers the arrangement 100 according to an embodiment of the invention from the second system state back to the first system state. To this end, the method 950 comprises the steps of:

opening 901 the second switch 602 of the second grid supply 202;

matching 952 the phase of the distribution 800 to the phase of the first grid supply 201; and closing 953 the first switch 601 as soon as the phase of the distribution 800 and of the first grid supply 201 are matched, by way of which the arrangement 100 is in the first system state.

Measured values of the voltage measurement 500 are used in the steps 902, 952 of matching the phase of the distribution 800 to the phase of the first grid supply 201 or of the second grid supply 202.

In the normal case of the first system state, the grid connection 300 cycles but does not transfer any power and also does not deliver any reactive power. If the voltage supply from the first grid supply 201 should break down, the grid connection 300 ensures that the voltage is maintained through the supply of reactive and active power. In the event of the voltage supply breaking down, the first switch 601 opens. The grid connection 300 then gradually rotates the phase on the load side, that is to say the distribution 800, so as to be synchronous with the phase of the second grid supply 202. As soon as the phases are synchronous, the second switch 602 is able to be closed and the grid connection 300 is switched back into standby mode (that is to say cycles on the grid).

When a stable voltage is present again at the first switch 601, the switchover procedure may be performed back to the first grid supply 201. To this end, the grid connection 300 takes over the load flow from the second grid supply 202, the second switch 602 is opened, the grid connection 300 rotates the phase on the load side so as to be synchronous with the first grid supply 201, the first switch 601 is closed and the grid connection 300 goes into standby mode.

The invention claimed is:

1. An arrangement for compensating voltage drops in a power supply grid including a first grid supply and a second grid supply, the arrangement comprising:
at least one first converter system; and
one second converter system, intermediate circuits of the at least one first converter system and the one second converter system being coupled to form a grid connection, wherein the intermediate circuits are configured to have two line paths connected between the at least one first converter system and the one second converter system
wherein the first grid supply is connected to a distribution via a decoupling choke, a voltage measurement and a first switch,
wherein the second grid supply is connected to the distribution via a second switch,
wherein the grid connection is arranged in parallel with the second switch, and
wherein the arrangement further comprises battery systems that are connected to the intermediate circuits, and are configured to support voltage at the distribution in an event of a simultaneous failure of the first grid supply and the second grid supply.

2. The arrangement of claim 1, wherein the at least one first converter system and the one second converter system are each designed as an DC/AC converter system.

3. The arrangement of claim 2, wherein the distribution is designed as a medium-voltage distribution.

4. The arrangement of claim 2, wherein, in a first system state, the first switch is closed and the second switch is open.

5. The arrangement of claim 2, wherein, in a second system state, the first switch is open and the second switch is closed.

6. The arrangement of claim 1, wherein the distribution is designed as a medium-voltage distribution.

7. The arrangement of claim 6, wherein, in a first system state, the first switch is closed and the second switch is open.

8. The arrangement of claim 6, wherein, in a second system state, the first switch is open and the second switch is closed.

9. The arrangement of claim 1, wherein, in a first system state, the first switch is closed and the second switch is open.

10. The arrangement of claim 9, wherein, in a second system state, the first switch is open and the second switch is closed.

11. The arrangement of claim 1, wherein, in a second system state, the first switch is open and the second switch is closed.

12. A method for compensating a voltage drop in a power supply grid, including an arrangement originally in a first system state, the method comprising:
opening a first switch of a first grid supply of the power supply grid in an event of the voltage drop;
matching a phase of a distribution to a phase of a second grid supply of the power supply grid; and
closing a second switch as soon as the phase of the distribution and the phase of the second grid supply are matched, to place the arrangement in a second system state,
wherein the arrangement comprises:
at least one first converter system; and
one second converter system, intermediate circuits of the at least one first converter system and the one second converter system being coupled to form a grid connection, and
wherein the intermediate circuits are configured to have two line paths connected between the at least one first converter system and the one second converter system, and
wherein the arrangement further comprises battery systems that are connected to the intermediate circuits, and are configured to support voltage at the distribution in an event of a simultaneous failure of the first grid supply and the second grid supply.

13. The method of claim 12, wherein measured values of a voltage measurement are used to match the phase of the distribution to a phase of the first grid supply.

14. A method for compensating a voltage drop in a power supply grid, including an arrangement originally in a second system state, the method comprising:
opening a second switch of a second grid supply of the power supply grid;
matching a phase of a distribution to a phase of a first grid supply of the power supply grid; and
closing a first switch as soon as the phase of the distribution and the phase of the first grid supply are matched, to place the arrangement in a first system state,
wherein the arrangement comprises:
at least one first converter system; and
one second converter system, intermediate circuits of the at least one first converter system and the one second converter system being coupled to form a grid connection, and
wherein the intermediate circuits are configured to have two line paths connected between the at least one first converter system and the one second converter system, and
wherein the arrangement further comprises battery systems that are connected to the intermediate circuits, and are configured to support voltage at the distribution in an event of a simultaneous failure of the first grid supply and the second grid supply.

15. The method of claim 14, wherein measured values of a voltage measurement are used to match the phase of the distribution to a phase of the second grid supply.

* * * * *